United States Patent [19]
Drzewinski

[11] Patent Number: 5,338,798
[45] Date of Patent: Aug. 16, 1994

[54] BLOCK COPOLYMERS CONTAINING STEREOREGULAR POLYMETHYL METHACRYLATE AND THEIR BLENDS WITH POLYCARBONATES

[75] Inventor: Michael A. Drzewinski, Princeton Junction, N.J.

[73] Assignees: Istituto Guido Donegani S.p.A., Novara; Enichem S.p.A., Milan, both of Italy

[21] Appl. No.: 953,950

[22] Filed: Sep. 30, 1992

[51] Int. Cl.$^5$ .................. C08L 69/00; C08L 53/00
[52] U.S. Cl. ........................ 525/92; 525/90; 525/94; 525/148; 525/299
[58] Field of Search ............ 525/90, 92, 94, 148, 525/299

[56] References Cited

U.S. PATENT DOCUMENTS

| | | | |
|---|---|---|---|
| 3,103,503 | 9/1963 | Fox | 526/329.7 |
| 4,754,005 | 6/1988 | Roggero et al. | 526/83 |
| 4,906,638 | 3/1990 | Fischer et al. | 525/148 |
| 4,997,883 | 3/1991 | Fischer et al. | 525/67 |

FOREIGN PATENT DOCUMENTS

| | | |
|---|---|---|
| 0297285 | 1/1989 | European Pat. Off. |
| 0326968 | 8/1989 | European Pat. Off. |
| 017112 | 1/1991 | Japan |

OTHER PUBLICATIONS

Polymer International, vol. 24, pp. 197–206, 1991, R. P. Quirk, et al., "Dilithium Initiators Based on 1,3-bis(1--phenylethenyl)benzene. Tetrahydrofuran and Lithium sec-Butoxide Effects".

Thermoplastic Elastomers, pp. 50–53, 1987, "Synthesis".

Handbook of Thermoplastic Elastomers, Second Edition, pp. 13–14, 1988, "Synthesis and Commercial Production".

Polymer Engineering and Science, vol. 29, No. 8, pp. 538–542, Apr., 1989, R. Fayt, et al., "Molecular Design of Multicomponent Polymer Systems. XV. Morphology and Mechanical Behavior of Blends of Low Density Polyethylene with Acrylonitrile-Butadiene-Styrene (ABS), Emulsified by a Poly(Hydrogenated Butadiene-b-Methyl Methacrylate)Copolymer".

Journal of Polymer Science: Part A: Polymer Chemistry, vol. 27, pp. 4001–4012, 1989, T. E. Long, et al., "Synthesis and Characterization of Poly(t-Butyl Methacrylate-b-Isoprene-b-t-Butyl Methacrylate)Block Copolymers by Anionic Techniques".

Macromolecules, vol. 23, pp. 2618–2622, 1990, S. K. Varshney, et al., "Anionic Polymerization of (Meth)Acrylic Monomers. 4. Effect of Lithium Salts as Ligands on the 'Living' Polymerization of Methyl Methacrylate Using Monofunctional Initiators".

Polymer Preprints, vol. 32, No. 1, pp. 299–300, Apr., 1991, R. Fayt, et al., "New Developments in The 'Living' Anionic Polymerization of (Meth)Acrylic Ester".

ACS Polymer Preprints, pp. 150–151, 1989, D. Bucca, et al., "Triblock Copolymers via Dianionic Initiators".

Recent Advances in Anionic Polymerization, pp. 173–184, 1987, G. Huynh-Ba, et al., "Pyridine–Medicated Anionic Homo-and Copolymerization of Alkylmethacrylate".

(List continued on next page.)

Primary Examiner—David Buttner
Attorney, Agent, or Firm—Oblon, Spivak, McClelland, Maier & Neustadt

[57] ABSTRACT

Polycarbonates (PC) can be blended over all compositions with block copolymers containing stereoregular polymethyl methacrylate (s-PMMA) in which at least 60% of the monomer units are in the syndiotactic configuration to form modified but transparent polycarbonates for a number of applications. Additional homopolymers corresponding to the blocks of the copolymer may also be added to even further modify the properties of the polycarbonate while still retaining transparency.

11 Claims, No Drawings

OTHER PUBLICATIONS

Encyclopedia of Polymer Science & Engineering, 2nd Edition, vol. 7, pp. 807–817, 1987, D. N. Schulz, "Hydrogenation".

Recent Advances In Anionic Polymerization, pp. 363–380, 1987, A. D. Broske, et al., "Investigations of Hydrocarbon Soluble Difunctional Organolithium Initiators Based Upon 1,3-Bis(Phenyl Ethyl Benzene)".

Polymer, vol. 32, No. 7, pp. 1274–1283, 1991, M. Nishimoto, et al., "Miscibility of Polycarbonate with Methyl Methacrylate-Based Copolymers".

Journal of Applied Polymer Science, vol. 44, pp. 2233–2237, 1992, T. Kyu, et al., "Single-Phase Blends of Polycarbonate and Poly(Phenyl Methacrylate)".

Recent Advances in Mechanistic and Synthetic Aspects of Polymerization, pp. 101–117, 1987, R. Jerome, et al., "The Anionic Polymerization of Alkyl Acrylates: A Challenge".

Recent Advances in Mechanistic and Synthetic Aspects of Polymerization, pp. 79–100, T. E. Long, et al., "Controlled Synthesis of Various Poly(Alkyl Methacrylates) by Anionic Techniques".

BLOCK COPOLYMERS CONTAINING STEREOREGULAR POLYMETHYL METHACRYLATE AND THEIR BLENDS WITH POLYCARBONATES

BACKGROUND OF THE INVENTION

1. Field of the Invention

This invention pertains to polymer blends containing a polycarbonate (PC) and a block copolymer represented by the formula A-b-B (diblock); A-b-B-b-A (triblock); B-b-A-b-B (triblock); or (A-B)$_n$ (multiblock) as examples, where A is a stereoregular polymethyl methacrylate block (s-PMMA) with at least 60% of its monomer units in the syndiotactic configuration and B is a second polymer block, such as polyisoprene (PiP), polybutadiene (PBD), polylauryl methacrylate (PLM) siloxane rubber or polybutyl acrylate (PBA); and "b" indicates a block structure. When thoroughly blended with polycarbonate, these new block copolymers enhance properties such as thick section toughness and low temperature impact strength.

2. Discussion of the Background

The term "thermodynamically miscible" is used in the art to define a polymer mixture that mixes on the molecular level to form a single, homogeneous phase which exhibits only one glass transition. The term "mechanically compatible" means that mixing of the polymers is on a small scale but larger than the molecular level. Furthermore, mechanical compatibility implies that the multiple phases exhibit good adhesion to one another and yield good mechanical properties. Although both thermodynamically miscible and mechanically compatible blends exhibit good mechanical properties, only thermodynamically miscible blends are transparent owing to their single phase nature.

Aromatic, polycarbonates generally have good thermal stability, good dimensional stability, good impact strength in thin sections, relatively good stiffness and most notably good transparency. For these reasons, PC is used in a variety of applications including glass replacement, housings, medical devices and containers. Nevertheless, PC does have drawbacks such as poor scratch resistance, poor long term U.V. stability and poor stress birefringence which must be dealt with, especially in demanding optical applications. Moreover, it is often desirable to also improve the processability, thick section toughness and low temperature impact strength of PC without sacrificing its transparency.

Methacrylate ester-based polymers suffer from poor dimensional stability and poor heat distortion yet have good clarity, surface hardness, U.V. resistance and processability. For this reason they are commonly used in applications such as window glazings, aircraft windows, automotive lenses and lightcovers. Thus, blends of PC and methacrylate polymers should have a good balance of properties and, if they formed a single phase, would be clear. Unfortunately ordinary (i.e., stereorandom) polymethylmethacrylate is not thermodynamically miscible with polycarbonate, meaning that their blends are opaque. This phenomenon has been reported in the literature many times and it has been often observed that such blends also suffer from poor low temperature impact strength and poor thick section toughness. The simple addition of a rubber impact modifier would greatly improve strength but would further reduce transparency because rubber impact modifiers are incompatible with both PC and polymethylmethacrylate. Thus, the task existed of finding methacrylic polymers that are thermodynamically miscible with polycarbonates and which could simultaneously be modified with a rubbery material like polyisoprene. The resulting blends would exhibit not only the improvements gained from blending PC and a methacrylic polymer, but would also have improved thick section toughness and low temperature impact strength, all while retaining the inherent transparency of polycarbonate.

Although blends of PC with methacrylic polymers are often mechanically compatible, resulting in improvements over the respective components, most are typically not miscible and so their opacity makes them unacceptable in many applications. The current understanding (Polymer, 32, page 272, 1991) is that traditional, free radically polymerized PMMA does not form a single, thermodynamically miscible, transparent blend with PC but does demonstrate mechanical compatibility. U.S. Pat. No. 4,319,003 teaches that blends of PC and polymethyl methacrylate (PMMA) are not only opaque, but often do not possess the advantageous properties expected of such a mixture. Among other references that report the immiscibility of PMMA with PC are JP 7216063 and EP 0297285.

Ways to overcome the immiscibility of typical PC/PMMA mixtures have, however, been disclosed. Most commonly employed is the addition of comonomers to the PMMA (DE 2264268; DE 3632946; and U.S. Pat. No. 4,906,696). In U.S. Pat. No. 4,319,003, the use of a PC-PMMA block copolymer is cited as an improvement over PC/PMMA blends themselves, but such materials cannot demonstrate clarity and mechanical property improvements simultaneously.

Similarly, mixing processes have been developed which can produce transparent PC/PMMA blends. According to DE 3,833,218, transparent mixtures of aromatic polycarbonates and polyalkyl methacrylates can be produced by melting the two components in the presence of a supercritical gas. Also U.S. Pat. No. 4,743,654 and U.S. Pat. No. 4,745,029 disclose that one may produce solutions of the two polymers in organic solvents, allow the solvent to evaporate, and thus produce a transparent film. Unfortunately all of these methods suffer from the drawback of bubble formation and other imperfections which would render them unsuitable for many applications. Since care is needed in such methods, these processes are slow relative to traditional melt forming processes like extrusion and molding. Furthermore, they are limited to small, thin parts like films owing to the need to remove gas and solvents. A further disadvantage of such processes is gradual deterioration and breakup of the material arising from phase separation of the two polymers since mixtures formed by these processes are metastable.

Recently, a number of patents and publications have appeared which report that PC is miscible with random copolymers containing methylmethacrylate and either cyclohexyl methacrylate or phenyl methacrylate. The thermodynamic miscibility of PC with pure polyphenyl methacrylate was also reported. EP 0297285; U.S. Pat. No. 4,906,696; J Appl. Polym. Sci. 44., 2233-2237, 1991; and Polymer 32(7), 1274-1283 (1991).

I have recently discovered that stereoregular polymethyl methacrylate in which at least 60% of the monomer units are in the syndiotactic configuration (s-PMMA) is also thermodynamically miscible with polycarbonate in all ratios. That is, they form a single, homogeneous phase resulting in highly transparent and stable materials.

In the case of phenyl methacrylate, the miscibility property was used to increase the adhesion between a rubbery impact modifier, ethylene-propylene-diene (EPDM), and polycarbonate by grafting phenyl methacrylate onto EPDM. However, this graft copolymer was mechanically compatible with PC but not thermodynamically miscible, as might have been hoped.

U.S. Pat. No. 4,997,883 and EP 0326938 both teach the art of grafting aromatic(meth)acrylate/methyl methacrylate random copolymers onto a pre-existing EPDM polymer to prepare an elastomeric graft copolymer which, when added to PC, shows improvement in impact strength. Unfortunately, all of these materials are opaque. Thus, the task still existed to develop a means of blending PC with impact modifiers without simultaneous loss of clarity.

Block copolymers are a general class of materials which can exhibit a wide range of properties and are unique in their ability to "microphase separate" which refers to a fine separation of the two dissimilar polymer blocks into distinct phases.

It has now been discovered that block copolymers containing one or more blocks of s-PMMA (greater than 60% sydiotactic) are also miscible with polycarbonate, but since they microphase separate within the resulting blends, have the ability to disperse the second block effectively. The microphase of "second block" polymer is uniformly distributed throughout the polycarbonate and of a size smaller than the wavelength of visible light. This represents a distinct improvement over the approach where PC-miscible polymers are grafted onto an impact modifier.

The present invention also provides a synthetic route to the production of novel block copolymers containing s-PMMA from which mixtures of polycarbonate and s-PMMA block copolymers having greatly improved properties over the individual components, yet retaining the highly favorable characteristic of transparency can be prepared for the first time.

The present invention pertains to PC/(s-PMMA)-b-B binary blends, as well as ternary blends containing up to 15% of additional s-PMMA and/or B homopolymers. These compositions contain a thermodynamically miscible, single phase of PC and s-PMMA, as well as very finely dispersed particles of the "B" block which are usually on the order of 40 to 2,000 angstroms and thus much smaller than the wavelength of light. The combined effects of the single phase nature of the PC and s-PMMA, plus the very small size of the dispersed second block leads to an optically transparent material. Furthermore, the chemical attachment of the B block to the s-PMMA block assures perfect adhesion and translation of properties from the "B" block to the PC/s-PMMA phase. Thus, one can obtain a mixture which combines the advantageous properties of two dissimilar materials and still maintains transparency. Such a fine and stable dispersion can only be obtained through the use of block copolymers which have one block that is thermodynamically miscible with the PC. Therefore the basis of this invention arises from the coupling of: 1) the thermodynamic miscibility of the s-PMMA block and PC; 2) the phase separation behavior of block copolymers; and 3) the ability of the second block of the copolymer to impart beneficial changes to the PC matrix.

A general synthesis of well defined methacrylic ester containing block copolymers has only recently been accomplished (See for example: "Recent Advances in Mechanistic and Synthetic Aspects of Polymerization", Kluwer Academic Publishers, Norwell, Mass., 1987; and "Recent Advances in Anionic Polymerizations", Elsevier Publishing Co., New York, N.Y., 1987). These reports have focused primarily on polymers containing blocks of polymethyl methacrylate or polybutyl methacrylate made by an anionic polymerization mechanism. Anionic polymerization is used for the synthesis of well defined block copolymers because the reaction has no naturally occurring termination step. However, the presence of carbonyl groups initially caused problems with the polymerization of methacrylate monomers until methods were developed to prevent nucleophilic attack on the carbonyl groups. The most commonly accepted method combines the use of low temperature polymerization ($-78°$ C.) and modification of the initial anion, either by prereaction with 1,1-diphenylethylene, or by variation of its reactivity by reaction/chelation with pyridine and/or LiCl.

SUMMARY OF THE INVENTION

It is an object of this invention to provide a thermoplastic, melt processable composition which is a mechanically compatible, transparent blend of polycarbonate and a block copolymer containing a syndiotactic polymethyl methacrylate block.

It is another object of this invention to prepare blends in which polycarbonate and the syndiotactic polymethyl methacrylate portion(s) of a block copolymer form a thermodynamically miscible, stable, single phase material at all compositions while the other portion(s) is microphase separated with a dispersed size less than the wavelength of light, resulting in a transparent and improved PC based material.

It is still another object of this invention to provide well defined block copolymers containing a syndiotactic polymethyl methacrylate block and a second block. When blended with polycarbonate these new copolymers enhance the thick section and low temperature toughness of the material.

DETAILED DESCRIPTION OF THE PREFERRED EMBODIMENTS

Known anionic synthetic routes can be modified to prepare well defined block copolymers containing syndiotactic polymethyl methacrylate blocks having at least 60% of the methacrylate units in the syndiotactic configuration. When blended with polycarbonates they exhibit one glass transition for the mixed PC/s-PMMA phase and contain well dispersed, microphase separated particles of the second block which act to enhance the thick section and low temperature impact properties of the PC material. Most importantly and uniquely, the improvement in properties occurs without loss of clarity. This behavior is observed over all ratios of PC and s-PMMA block copolymer. In general they contain:

(I) 1 to 99 weight % of an aromatic polycarbonate (PC), preferably one derived from Bisphenol A, and (II) 99 to 1 weight % of a block copolymer which has at least one block consisting of a syndiotactic polymethyl methacrylate and another block, such as polyisoprene, which is capable of imparting improvements to PC, such as thick section or low temperature toughness.

In addition, one may also add the corresponding homopolymers of the block copolymer (e.g., syndiotactic polymethyl methacrylate and/or polyisoprene) in amounts of 0–15 weight % compared to the total weight of the PC and the s-PMMA block in order to widen the property variations possible while still maintaining clarity. Furthermore, if one chooses, more than 15% of the corresponding homopolymers may be added to achieve an even wider variation in properties, but at the loss of transparency.

The block copolymers of this invention are of general diblock, triblock and multiblock structures represented by the formulae A-b-B (diblock), A-b-B-b-A (triblock), B-b-A-b-B (triblock) or (A-B)$_n$ (multiblock) where the A block is a polymethyl methacrylate in which at least 60% of the monomer units are in the syndiotactic configuration, preferably above 90%; the B block is a polymer capable of imparting improvements in PC properties when properly blended, particularly thick section and low temperature toughness; and "b" represents a block structure. Examples of B type polymers are polyisoprene, polybutadiene, polylauryl methacrylate, and poly-$C_1$–$C_{10}$-alkyl acrylates. In addition, styfenics, such as polystyrene, poly-$C_1$–$C_4$-alkyl styrene, dienic rubbers and siloxane elastomers are suitable.

The syndiotactic polymethyl methacrylate components of this invention are of the general formula:

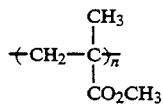

where n is an integer from 10 to 5,000; preferably from 60 to 3,000 and most preferably from 120 to 850.

The stereoregularity of the polymethyl methacrylate block is determined by the triad composition ratios as measured by nuclear magnetic resonance. An isotactic triad has two successive meso placements (denoted mm); syndiotactic polymer has two racemic placements (denoted rr); and atactic is denoted as mr and rm. Thus, random probability would yield a polymer with a triad composition of:

| i | a | s |
|---|---|---|
| 1 (25%) | 2 (50%) | 1 (25%) | since the probability of mr and rm placements are equivalent. The materials of interest for this invention have greater than 60% syndiotactic character and usually over 90% when prepared by the specific method described in this invention.

The s-PMMA block copolymers of this invention have been prepared by a modified anionic polymerization scheme. The second block material (e.g. polyisoprene) is synthesized first, using n-butyl lithium as an initiator for the polymerization of isoprene which is dissolved in an inert solvent such as toluene. This portion of the reaction is carried out at 40° C. for approximately 2–4 hours depending on the size of the reaction. In all cases, the reaction is carried to completion in terms of 100% conversion of monomer to polymer. At this point, 1,1-diphenylethylene is added in an amount equivalent to the number of living anionic chain ends. A small amount of an etherial solvent such as tetrahydrofuran is also added. Upon addition of these ingredients, the reaction is cooled to −78° C. and methyl methacrylate is added. Again the reaction is run to completion so that all of the monomer is consumed, at which point acidified methanol is added to terminate the anionic chain ends. The resulting soluble polymer is precipitated from the toluene into a non-solvent, such as methanol, washed with methanol and vacuum dried.

Block copolymers made in this fashion are typically of the A-b-B type (i.e., A-B diblock) but one can make B-b-A-b-B (i.e., B-A-B triblock), A-b-B-b-A (i.e., A-B-A triblock) and (A-B)$_n$ multiblock types by employing known methods in the art such as difunctional initiators, reactive coupling and sequential addition techniques. Triblock copolymers are usually prepared by one of three methods: sequential addition of monomers, reactive coupling, or difunctional initiation. In the first method, the monomers are reacted in sequence as implied so as to form an A-B-A type material. In the second method an A-B type material is initially produced but is coupled while still reactive so as to form an A-(BB)-A or simply A-B-A triblock. The coupling reaction occurs by addition of a difunctional linking material including certain diester, diorganohalogen, silicon dihalides, and iminic compounds. Examples of these coupling agents have been reviewed and patented. ("Thermoplastic Elastomers", eds. No. Legge, G. Holden & H. Schroeder, MacMillan Publishing, New York, 1987; "Handbook of Thermoplastic Elastomers", 2nd ed. eds. B. Walker and C. Rader, Van Nostrand Publishers, New York, 1988; U.S. Pat. No. 4,754,005). The third method of difunctional initiation works by polymerizing the material from the inside out by beginning the polymerization of the "b" block first on both ends simultaneously and then the addition of the "A" monomer leads to the A-B-A structure. Examples of such initiators include: 2:1 n-butyl lithium:1,3-bis(1-phenylethenyl)benzene; m-xylene dianions prepared by addition of m-xylene to two equivalents of Lochmann's base (1:1 n-butyl lithium:potassium t-butoxide complex in hexane); and 2:1 n-butyl lithium:m-disopropenylbenzene. The synthesis and use of these materials has been documented. (Polymer International, 24, 197, 1991; ACS Polymer Preprints, April 1989, pp. 150–151; and "Recent Advances in Anionic Polymerizations", eds. T. Hogen-Esch & J. Smid, Elsevier Publishers, Netherlands, 1987.)

In the case where block B is derived from a diene such as isoprene, residual carbon-carbon double bonds exist in the rubber. Homopolymers and copolymers containing dienics such as polybutadiene and polyisoprene can be hydrogenated so as to produce a new material with improved thermal and oxidative stability over the original dienic materials. There are many methods of hydrogenation but the most preferable are catalytic hydrogenations using mixed systems containing a transition metal salt (usually based on cobalt or nickel) and a reducing agent such as triethylaluminum or n-butyllithium. Examples include homogeneous cobalt chloride/pyridine/triethylaluminum complexes; homogeneous nickel octanoate/triethylaluminum complexes; and homogeneous rhodium systems such as [P($C_6H_5$)$_3$RhCl]. Heterogenous systems can also be used by supporting active catalysts such as [P($_6H_5$)$_3$RhCl] on inert substrates such as silica, zeolites, carbon black, etc. Details of hydrogenation can be found in many reviews such as in the "Encyclopedia of Polymer Science and Engineering" 2nd edition, Volume 7, John Wiley & Sons, New York, 1987.

Generally, the s-PMMA block should be above 10,000 g/mole in molecular weight and more preferably in the 12,000 to 85,000 g/mole range, although any molecular weight can be made. Similarly, the second block should also be above 10,000 g/mole and more preferably in the 30,000 to 150,000 range. The relative ratios of the two blocks can be varied as well depending on the resultant property variation desired. For thick section toughness and low temperature impact strength, one would prepare a material containing predominately the second block (e.g. polyisoprene) with a s-PMMA/-polyisoprene ratio of about 1:3 to 1:5. The ratio of lengths of each block are generally 0.1:1 to 1:1, preferably 0.5:1 to 1:1.

The specific use of a block copolymer and the fact that it is made up of a syndiotactic polymethyl methacrylate are the key factors leading to miscibility between polycarbonate and a variety of block copolymers. By coupling the concepts s-PMMA PC miscibility and the use of s-PMMA block copolymers, a totally transparent, but property-altered PC-based material can be produced. More specifically, it is the miscibility of the PC and s-PMMA that gives a single, transparent phase and it is the unique phase separating behavior of block copolymers that finely disperses the other block in the PC/s-PMMA phase at a size smaller than the wavelength of light. Moreover, additional homopolymer materials may be added to these binary blends which act only to either mix homogeneously, as in the case of s-PMMA, or to swell the dispersed second phase in the case of additional second block homopolymer. This swelling can continue until the dispersed phase grows in size near to that of the wavelength of light. This does not occur below 15 weight % but obviously one may elected to add more than 15% if transparency is not important.

It is apparent that the characteristics of the final material will be strictly dependent on the content of the various components of the alloy such that the properties will vary from those of pure PC to those of the pure block copolymer. Since such blends can be made at will, a wide variety of properties can be achieved. At higher proportions of PC, one should expect to have higher temperature resistance, dimensional stability and stiffness with an improvement in processability, scratch resistance, thick section toughness and low temperature impact strength over that of PC. At higher levels of block copolymer, one may expect very high toughness and low temperature performance with a relative increase in stiffness and dimensional stability over that of the pure block copolymer. Thus, this invention can be used to overcome not only the deficiencies of PC but those of s-PMMA and/or s-PMMA block copolymers, all while retaining transparency.

The polymer blends of this invention constitute a new class of polymer blends which have numerous commercial application owing to their transparency and improved properties over that of PC, s-PMMA or s-PMMA block copolymers alone. They may be used in existing applications for PC where transparency is important but would provide additional benefits such as low temperature performance, better scratch resistance and better environmental stability than existing PC-based materials. New applications such as improved optical disks, clear housings, medical containers, window glazings, greenhouse windows, recreational equipment, filter housings, food storage, water bottles, etc. could all easily be prepared with these improved resins.

The alloys of the present invention may be prepared with a wide variety of aromatic polycarbonates such as one derived from bisphenol A. Suitable aromatic polycarbonates are homo- or co-polycarbonates and mixtures thereof. The polycarbonates are produced by reacting di-(monohydroxyaryl)-alkanes, dihydroxybenzenes or halogen substituted derivatives thereof with derivatives of carbonic acid such as carbonic acid diesters, phosgene, bis-chlorocarbonic acid esters of di-(monohydroxyaryl)-alkanes, the bis-chlorocarbonic acid esters of dihydroxybenzenes and their substituted derivatives. These polymers can be manufactured by known processes as described in U.S. Pat. No. 4,548,997.

Aromatic polycarbonates are represented by the formula

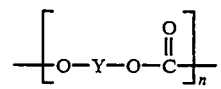

wherein Y is a radical of formula

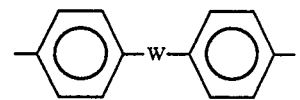

wherein W is $C_1$–$C_6$ straight or branched alkyl, carbonyl, sulfonyl, oxygen, sulfur or single bond, and n is an integer between 10 and 30,000, preferably between 100 and 10,000.

Suitable diphenolic compounds "Y" include: 2,2-bis(4-hydroxyphenyl)propane, bis-(4-hydroxyphenyl)methane, 2,2-bis-(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenyl)propane and (3,3'-dichloro-4,4-dihydroxyphenyl)methane.

Such polycarbonates are typically prepared using a molecular weight regulator, and acid acceptor and a catalyst. The molecular weight regulators include phenol, cyclohexanol, methanol and para-tert-butylphenol. The acid acceptors can be either organic or inorganic bases such as alkyl and aromatic amines like pyridine, triethylamine and dimethylaniline as well as hydroxides, carbonates and phosphates of alkaline and alkaline earth metals.

The catalysts used for the production of polycarbonate are those that promote esterification and include tertiary amines, quaternary ammonium compounds and quaternary phosphonium compounds. Examples include triisopropyl amine, tetraethylammonium bromide and n-butyltriphenylphosphonium bromide.

The preferred polycarbonates are produced with a bisphenol such as 2,2-bis-(4-hydroxyphenyl)propane, more commonly known as Bisphenol A. Polycarbonates of the Bisphenol A type are commercially available and include Makrolon (Mobay Corporation), Lexan (General Electric Corporation) and Sinvet (EniChem). The number average molecular weights of these polycarbonates are on the order of 10,000 to 200,000 g/mole but more preferably in the 20,000 to 100,000 range with relative viscosities of about 1.0 to 1.5 as measured in methylene chloride at 0.5 weight % and at 25° C.

The preferred polymer blends of this invention are binary blends of polycarbonate with block copolymers containing syndiotactic polymethyl methacrylate- In addition to the above described components, alloys of this invention may contain materials such as stabilizers, antioxidants, slip agents, plasticizers, flame retarders, fillers, antistats, colorants, etc., provided they do not impair the effects of the present invention, that being the improvement in mechanical properties without loss of transparency.

Antioxidants include phenolics, hindered amines, thioesters, and phosphite compounds. Suitable dyes, pigments and special color concentrates include a wide variety of chemical compounds, both organic and inorganic. Leading suppliers include Ferro, Harwick, Ciba-Geigy and Crowley.

Flame retardants include aluminum hydrates, halogenated compounds, antimony trioxide and phosphate esters. They are sold by a wide variety of companies including Mobay, Ferro, Harwick and Akzo.

Ultraviolet stabilizers are quite complex compounds but are generally of the benzophenone, benzotriazole or nickel-organic types. They are sold by Ciba-Geigy, BASF, Ferro, American Cyanamid.

Suitable fillers include aramid fibers, glass fibers, ceramic fibers, metal fibers, carbon fibers, fillers such as glass beads, minerals such as calcium carbonate, kaolin, talc, micas and silicas.

In order to maintain the transparent nature of this invention, such additives must also be miscible with the polymers. However, one may choose to give up the benefit of transparency for greater improvement in some other property, such as impact strength or tensile strength, through the use of non-miscible additives.

The blends of this invention are prepared by many processes known in the art for compounding- The components may be mixed in solution or in the molten state using various forms of mechanical and thermal processing equipment such as roll mixers, blade mixers, screw extruders and the like. The resultant blend can then be further processed and shaped by well known methods such as all forms of extrusion and molding.

The resulting blends are transparent thermoplastic materials with a wide range of properties, in particular more favorable properties, than those exhibited by any component alone. For example, the thermoplastic processing, the long term environmental stability, the scratch resistance, the thick section toughness and the low temperature impact strength of commercial polycarbonates can all be improved through the teachings of this invention. As a result, the blends of this present invention have many commercial applications.

Other features of this invention will become more apparent in the course of the following descriptions of exemplary embodiments which are given for illustration of this invention and are not intended to be limiting thereof.

EXAMPLE 1

Synthesis of Syndiotactic Polymethyl methacrylate—Polyisoprene Diblock Copolymer (s-PMMA-PiP).

All reagents for this work were purified by conventional procedures to meet the stringent standards for anionic synthesis. Toluene (500 ml) was transferred into a clean 1,000 ml glass reactor under purified argon gas and heated to 40° C. 0.4 ml of 1.6 M n-butyl lithium was added by syringe followed by 25 ml of isoprene monomer. Aliquots were extracted periodically to follow the percent conversion by gel permeation chromatography. After all of the isoprene was converted to polymer, 0.11 ml of 1,1-diphenylethylene was added followed by 50 ml of tetrahydrofuran. After ten minutes the reaction was gradually cooled to −78° C. at which time 25 ml of methyl methacrylate were added. Again aliquots were taken and the conversion of methyl methacrylate monitored by GPC. At the end of the reaction, 6 ml of acidified methanol were added to terminate the living anionic end groups. The total contents of the reaction was then precipitated in 1,700 ml of methanol, filtered, washed with methanol and vacuum dried. Differential scanning calorimetry of the product shows that it exhibits two glass transitions at −55° C. and 132° C. corresponding to the polyisoprene and syndiotactic methyl methacrylate blocks, respectively. Transmission electron microscopy revealed a microphase separated morphology on the order of 200 angstroms which is indicative of a block copolymer structure.

EXAMPLE 2

Synthesis of Syndiotactic Polymethyl Methacrylate—Polylauryl Methacrylate Diblock Copolymer (s-PMMA-PLMA).

In a reaction setup analogous to Example 1, a diblock copolymer of syndiotactic polymethyl methacrylate—polylauryl methacrylate was prepared. This reaction was slightly different than Example 1 in that it was run entirely at −78° C. and the 1,1-diphenylethylene and tetrahydrofuran were added immediately after the n-butyllithium and before any monomers. DSC revealed two Tg's of approximately −70° C. and 111° C. for the respective polylauryl methacrylate and syndiotactic polymethyl methacrylate phases. Transmission electron microscopy confirmed the block copolymer structure.

EXAMPLE 3

Synthesis of Syndiotactic Polymethyl Methacrylate—Polystyrene Diblock Copolymer (s-PMMA-PS).

In a reaction scheme analogous to Example 1, a diblock copolymer of syndiotactic polymethyl methacrylate—polystyrene was prepared. DSC revealed two Tg's of approximately 90° C. and 126° C. for the respective polystyrene and syndiotactic polymethyl methacrylate phases. Transmission electron microscopy confirmed the block copolymer structure.

EXAMPLE 4

Solution Prepared Blends with Polycarbonate.

Materials prepared in Examples 1, 2 and 3 were solution blended with polycarbonate of Tg-149° C. (Sinvet 251) in chloroform at room temperature at various weight ratios and each mixture was coagulated into isopropanol, filtered and dried under vacuum at 80° C. for several hours. Each blend was then tested by differential scanning calorimetry (DSC) after first being heated to 275° C. to remove any non-equilibrium effects and to simulate melt blending. Compression molded films of these blends were highly transparent to the eye. The DSC was run from 25° to 275° C. at 20° C./minute and the glass transition of the mixtures recorded. The results are contained in Table 1. The single glass transition exhibited by these blends is consistent with well known behavior for thermodynamically miscible polymer blends.

As a comparison, commercial non-syndiotactic polymethyl methacrylate (Scientific Polymer Products) was also solution blended with polycarbonate and tested in the same way. The resultant blends were opaque and brittle when compression molded and exhibited two glass transitions as measured by DSC. The results are also contained in Table 1.

TABLE 1

| PC/Block | s-PMMA-PiP Tg | s-PMMA-PLMA Tg | s-PMMA-PS Tg | a-PMMA Tg |
|---|---|---|---|---|
| 100/0 | 149 | 149 | 149 | 149 |
| 85/15 | 146 | 145 | 146 | 115/147 |
| 70/30 | 144 | 140 | 145 | 118/149 |
| 50/50 | 142 | 131 | 141 | — |
| 30/70 | 139 | 123 | 136 | 117/148 |
| 15/85 | 136 | 114 | 132 | 116/147 |
| 0/100 | 132 | 111 | 126 | 111 |

EXAMPLE 5

Melt Processed Blends with Polycarbonate

A variety of mixtures containing polycarbonate, diblock copolymers prepared by the procedures of Examples 1, 2 and 3, and occasionally additional homopolymers, were melt blended in a Haake-Buechler miniextruder at 275° C. and then injection molded in a Engel Injection Molder at 270° C. The resultant molded bars were tested for impact strength at four temperatures: 20°, 0°, −20° and −40° C. and at two thicknesses of ⅛ and ¼" as per ASTM Standard D256. The results of these tests are summarized in Table 2 along with a notation of the transparency.

TABLE 2

| | (All values are in units of ft.-lb./in.) | | | | |
|---|---|---|---|---|---|
| Blend | 20° C. ⅛"\|¼" | 0° C. ⅛"\|¼" | −20° ⅛"\|¼" | −40° ⅛"\|¼" | Appearance |
| PC | 17/2.5 | 15/2 | 9/2 | 2/2 | Clear |
| A | 15/8 | 12/5 | 15/3 | 3/3 | Clear |
| B | 12/12 | 12/8 | 10/4 | 3/3 | Clear |
| C | 16/5 | 15/11 | 13/5 | 12/4 | Clear |
| D | 16/3 | 12/2 | 10/2 | 2/2 | Clear |
| E | —/8 | —/4 | —/2 | —/2 | Opaque |

Blend A = 90% PC + 10% s-PMMA-PiP of Example 1.
Blend B = 86% PC + 13.5% s-PMMA-PiP of Example 1 + 0.5% PiP.
Blend C = 92.5% PC + 7.5% s-PMMA-PLMA of Example 2.
Blend D = 90% PC + 10% s-PMMA-PS of Example 3.
Blend E = 95% PC + 5% Polybutadiene Rubber.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A resin composition comprising a blend of:
   (I) 1 to 99 wt % of a polycarbonate of formula

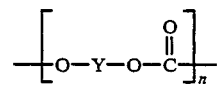

where Y is a divalent aromatic radical of formula

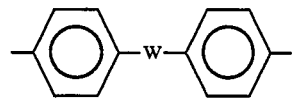

where W is $C_1$–$C_6$ straight or branched alkyl, carbonyl, sulfonyl, oxygen, sulfur or single bond, and n is an integer between 10 and 30,000;
   (ii) 99 to 1 wt % of a block copolymer containing a block of polymethylmethacrylate in which at least 60% of the monomer units are in the syndiotactic configuration and a block selected from the group consisting of polybutadiene, polyisoprene, poly-$C_1$–$C_{10}$-alkylacrylate, polystyrene, poly$C_1$–$C_4$(alkyl)styrene, dienic rubber and siloxane elastomer.

2. The composition of claim 1 wherein said polycarbonate contains Bisphenol A.

3. The composition of claim 1 comprising 10–90% of component (I).

4. The composition of claim 1 comprising 35–70% of component (I).

5. The composition of claim 1 wherein said s-PMMA block has a molecular weight of 30,000–300,000.

6. The composition of claim 1 wherein said aromatic polycarbonate has a molecular weight of 20,000–100,000.

7. The composition of claim 1 further comprising additives or modifiers selected from the group consisting of fillers, stabilizers, antioxidants, pigments, dyes and impact modifiers.

8. The composition of claim 1 wherein at least 90% of methylmethacrylate units are in the syndiotactic configuration.

9. The composition of claim 1 wherein component (II) is represented by the formula A-b-B, A-b-B-b-A, B-b-A-b-B or (A-B)$_n$ multiblock; A is a stereoregular polymethylmethacrylate in which at least 60% of the monomer units are in the syndiotactic configuration, B is a second polymer; and "b" indicates a block structure.

10. The composition of claim 9 wherein block B is a saturated hydrocarbon.

11. The composition of claim 1 wherein component (II) contains a block selected from the group consisting of polybutadiene, polyisoprene, polylauryl methacrylate, polybutyacrylate and polystyrene.

* * * * *